US012577055B2

(12) United States Patent
Xing

(10) Patent No.: US 12,577,055 B2
(45) Date of Patent: Mar. 17, 2026

(54) TRANSMISSION SYSTEM FOR TREADMILL AND TREADMILL COMPRISING THE SAME

(71) Applicant: Oma Fitness Equipment Co., Ltd., Foshan City (CN)

(72) Inventor: Kaibin Xing, Guangdong (CN)

(73) Assignee: Oma Fitness Equipment Co., Ltd., Guangdong (CN)

( * ) Notice: Subject to any disclaimer, the term of this patent is extended or adjusted under 35 U.S.C. 154(b) by 79 days.

(21) Appl. No.: 18/625,928

(22) Filed: Apr. 3, 2024

(65) Prior Publication Data

US 2025/0223112 A1 Jul. 10, 2025

(30) Foreign Application Priority Data

Jan. 4, 2024 (CN) .......................... 202410018055.9
Jan. 4, 2024 (CN) .......................... 202420027373.7

(51) Int. Cl.
*B65G 39/16* (2006.01)
*A63B 22/02* (2006.01)
*B65G 15/64* (2006.01)

(52) U.S. Cl.
CPC ............. *B65G 39/16* (2013.01); *B65G 15/64* (2013.01)

(58) Field of Classification Search
None
See application file for complete search history.

(56) References Cited

U.S. PATENT DOCUMENTS 8,464,862 B2 * 6/2013 Honeycutt ............. B65G 15/42
198/822
11,786,780 B2 * 10/2023 Tsai ................... A63B 22/0285
482/54
12,145,022 B2 * 11/2024 Yoo ..................... A63B 22/0285
12,201,873 B2 * 1/2025 Casoni ............... A63B 21/0058
2012/0184413 A1 7/2012 Lo
2016/0341290 A1 * 11/2016 Lin ........................... F16H 7/18
2017/0312567 A1 11/2017 Chang

FOREIGN PATENT DOCUMENTS

CN 109173148 A 1/2019
CN 211461932 U 9/2020
DE 7825381 U1 * 11/1978

OTHER PUBLICATIONS

Extended European Search Report issued Oct. 2, 2024 in connection with corresponding European Patent Application No. 24168054.5.

* cited by examiner

*Primary Examiner* — Kavel Singh
(74) *Attorney, Agent, or Firm* — Blank Rome

(57) ABSTRACT

A transmission system for a treadmill and a treadmill comprising the same. The transmission system comprises a driving roller, a driven roller and first conveyor belts, wherein the driving roller comprises driving wheels and a first synchronization rod; the driven roller comprises driven wheels and a second synchronization rod; the first conveyor belts are arranged on the driving wheels and the driven wheels located on the same side, and the first conveyor belts form transmission connection with the driving wheels and the driven wheels on the same side; working faces of the driving wheels and the driven wheels are provided with first edged portions arranged around outer circumferences of the driving wheels and the driven wheels, working faces of the first conveyor belts are provided with second edged portions adapted to the first edged portions, and the first edged portions are meshed with the second edged portions.

11 Claims, 5 Drawing Sheets

TRANSMISSION SYSTEM FOR TREADMILL AND TREADMILL COMPRISING THE SAME

CROSS-REFERENCE TO RELATED APPLICATION

This application claims priority to Chinese Patent Application No. 202410018055.9, filed on Jan. 4, 2024, and Chinese Patent Application No. 202420027373.7, filed on Jan. 4, 2024, the contents of both of which are hereby incorporated by reference in their entirety.

TECHNICAL FIELD

The present disclosure relates to the technical field of mechanical equipment, and particularly to a transmission system for a treadmill and a treadmill including the same.

BACKGROUND

Treadmills are commonly used fitness equipment in both homes and gyms, and also the simplest type of home fitness equipment today, making them the best choice for home fitness equipment. A treadmill consists of a tread bench for supporting a user to run thereon, and handrails equipped with various electronic components to control the treadmill and provide interactive functions.

SUMMARY

Embodiments of the present disclosure provide a transmission system for a treadmill and a treadmill including the same.

As a first aspect of the embodiments of the present disclosure, an embodiment of the present disclosure provides a transmission system for a treadmill, including:

a driving roller, including a first synchronization rod and driving wheels arranged at both ends of the first synchronization rod;

a driven roller, including a second synchronization rod and driven wheels arranged at both ends of the second synchronization rod; and first conveyor belts, arranged on driving wheels and driven wheels located on the same side, and forming transmission connection with the driving wheels and the driven wheels on the same side;

wherein working faces of the driving wheels and the driven wheels are provided with first edged portions arranged around outer circumferences of the driving wheels and the driven wheels, working faces of the first conveyor belts are provided with second edged portions adapted to the first edged portions, and the first edged portions are meshed with the second edged portions.

In some possible implementations, the first edged portions include a plurality of first protrusions in an edged shape arranged at intervals, the first protrusions are arranged around the outer circumferences of the driving wheels and the driven wheels, first grooves in an edged shape are formed between adjacent first protrusions, the second edged portions include a plurality of second protrusions in an edged shape arranged at intervals, and the second protrusions are meshed with the first grooves.

In some possible implementations, a projection shape of the first protrusions on an axial cross-section of the driving wheels and the driven wheels is a zigzag, and a projection shape of the second protrusions on the axial cross-section of the driving wheels and the driven wheels is a zigzag.

In some possible implementations, slots are arranged on the working faces of the driving wheels and the driven wheels, the slots are arranged around circumferences of the driving wheels and the driven wheels, the working faces of the first conveyor belts are provided with bulges adapted to the slots, and the bulges are arranged to extend along a length direction of the first conveyor belts.

In some possible implementations, a size of the slots in an axial direction of the driving wheels and the driven wheels is smaller than a size of the first edged portions in the axial direction of the driving wheels and the driven wheels.

In some possible implementations, a cross-section of the slots in the axial direction of the driving wheels and the driven wheels is a trapezoid, and a cross-section of the bulges in a width direction of the first conveyor belts is a trapezoid.

In some possible implementations, the transmission system further includes rolling members located below the first conveyor belts, and rolling faces of the rolling members are in contact with bottom faces of the bulges.

In some possible implementations, the transmission system further includes guide members arranged on a side of the first conveyor belts, and arrayed at intervals along a conveying direction of the first conveyor belts.

In some possible implementations, the first conveyor belts are two first conveyor belts, the first conveyor belts are respectively sleeved on the driving wheels and the driven wheels on both sides, a caterpillar track is connected between the two first conveyor belts, and the caterpillar track includes a plurality of track strips respectively fixed between the two first conveyor belts.

In some possible implementations, fixing holes are arranged at intervals on opposite close sides of the two first conveyor belts, and the plurality of track strips are in fixed connection with the first conveyor belts by fasteners passing through the fixing holes.

As a second aspect of the embodiments of the present disclosure, an embodiment of the present disclosure provides a treadmill, including the transmission system according to any embodiment of the present disclosure.

In some possible implementations, the treadmill further includes a driving mechanism in transmission connection with the first synchronization rod through a pulley mechanism, the pulley mechanism including a first pulley connected to an output shaft of the driving mechanism, a second pulley connected to the first synchronization rod, and a second conveyor belt arranged on the first pulley and the second pulley.

By applying the technical solutions of the embodiments of the present disclosure, following beneficial effects can be achieved: according to the transmission system for a treadmill, by providing the working faces of the driving wheels and the driven wheels with the first edged portions arranged around the outer circumferences of the driving wheels and the driven wheels, providing the working faces of the first conveyor belts with the second edged portions adapted to the first edged portions, and making the first edged portions meshed with the second edged portions, an area of contact of the first conveyor belts with the driving wheels and the driven wheels can be increased, and synchronous rotation of the first conveyor belts with the driving wheels and the driven wheels can be ensured, thereby increasing a friction force when the first conveyor belts operate with the driving wheels and the driven wheels, improving the synchronization of operation of the first conveyor belts with the driving wheels and the driven wheels, improving the stability of a process where the first conveyor belts operate with the driving wheels and the driven wheels, and facilitating a reduction of noise in an operation process of the transmission system.

The above summary is only for the purpose of illustration and not intended to make limitation in any way. In addition to the schematic aspects, implementations and features described above, further aspects, implementations and features of the present disclosure will be easily understood by referring to the drawings and the following detailed description.

BRIEF DESCRIPTION OF THE DRAWINGS

In the drawings, unless specified otherwise, the same reference numerals denote the same or similar parts or elements throughout the plurality of drawings. These drawings are not necessarily drawn to scale. It should be understood that these drawings only depict some implementations according to the present disclosure and should not be considered to be limitations to the scope of the present disclosure.

EXPLANATION OF REFERENCE NUMERALS

100. driving roller; 200. driven roller; 300. first conveyor belts; 410. first edged portion; 420. second edged portion; 510. slot; 520. bulge; 600. caterpillar track; 700. rolling member; 800. guide member; 910. driving mechanism; 920. pulley mechanism; 110. driving wheel; 120. first synchronization rod; 210. driven wheel; 220. second synchronization rod; 121. first body rod section; 122. first axis rod section; 221. second body rod section; 222. second axis rod section; 411. first protrusion; 412. first groove; 421. second protrusion; 610. track strip; 921. first pulley; 922. second pulley; 923. second conveyor belt.

DETAILED DESCRIPTION

Hereinafter, only certain exemplary embodiments are briefly described. As those skilled in the art could realize, the described embodiments may be modified in various ways without departing from the spirit or scope of the present disclosure. The drawings and description are therefore considered to be essentially exemplary and not limitative.

In a treadmill according to related technologies, a transmission system generally employs belt transmission to drive a running belt to work. Due to the low synchronization when two first conveyor belts drive the running belt to operate, the smoothness and stability of the treadmill are poor, and there is also a problem of loud noise in the transmission system.

By applying the technical solutions of the embodiments of the present disclosure, following beneficial effects can be achieved: according to the transmission system for a treadmill, by providing the working faces of the driving wheels and the driven wheels with the first edged portions arranged around the outer circumferences of the driving wheels and the driven wheels, providing the working faces of the first conveyor belts with the second edged portions adapted to the first edged portions, and making the first edged portions meshed with the second edged portions, an area of contact of the first conveyor belts with the driving wheels and the driven wheels can be increased, and synchronous rotation of the first conveyor belts with the driving wheels and the driven wheels can be ensured, thereby increasing a friction force when the first conveyor belts operate with the driving wheels and the driven wheels, improving the synchronization of operation of the first conveyor belts with the driving wheels and the driven wheels, improving the stability of a process where the first conveyor belts operate with the driving wheels and the driven wheels, and facilitating a reduction of noise in an operation process of the transmission system.

Figure 1:
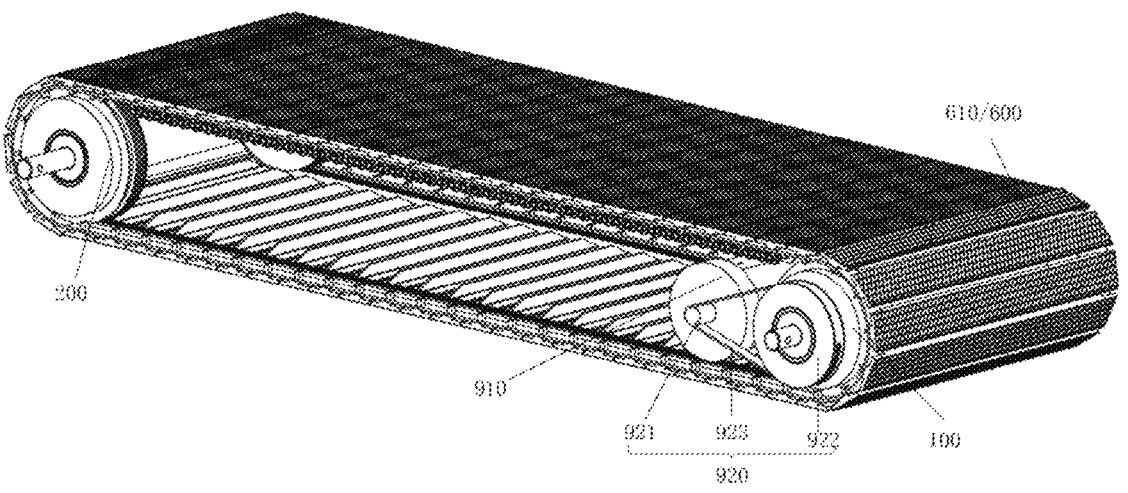
FIG. 1 is a schematic stereoscopic view of an overall structure of a transmission system in an embodiment of the present disclosure.
Figure 2:
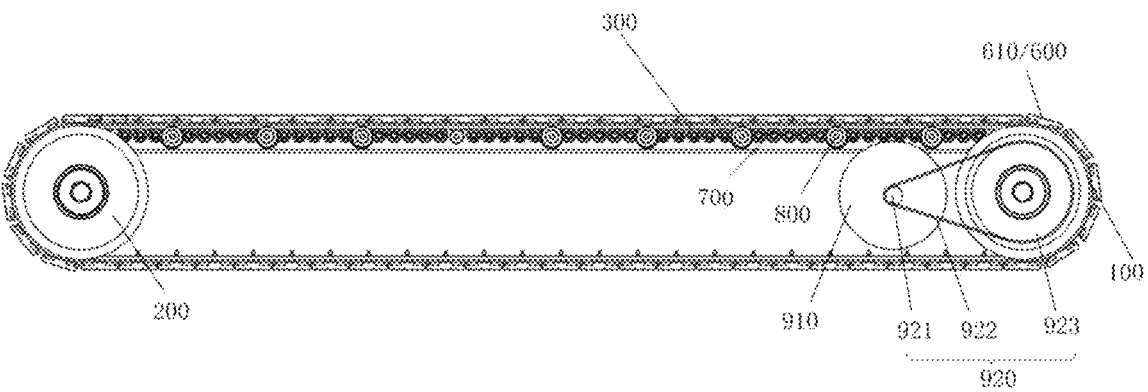
FIG. 2 is a schematic plan view of a structure of a transmission system in an embodiment of the present disclosure.
Figure 3:
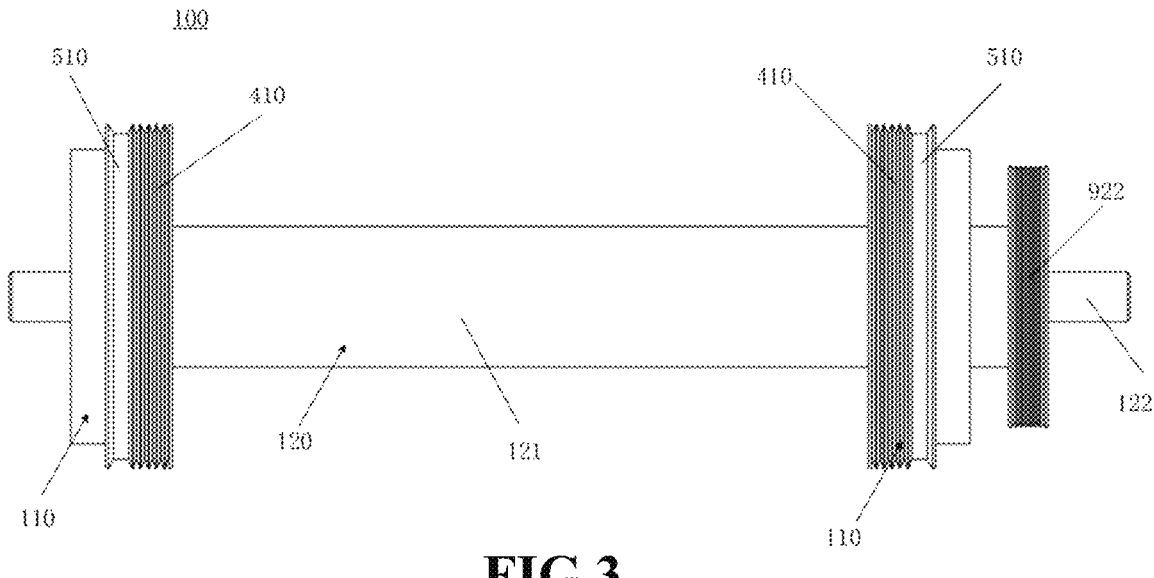
FIG. 3 is a schematic structural diagram of a driving roller of a transmission system in an embodiment of the present disclosure.
Figure 4:
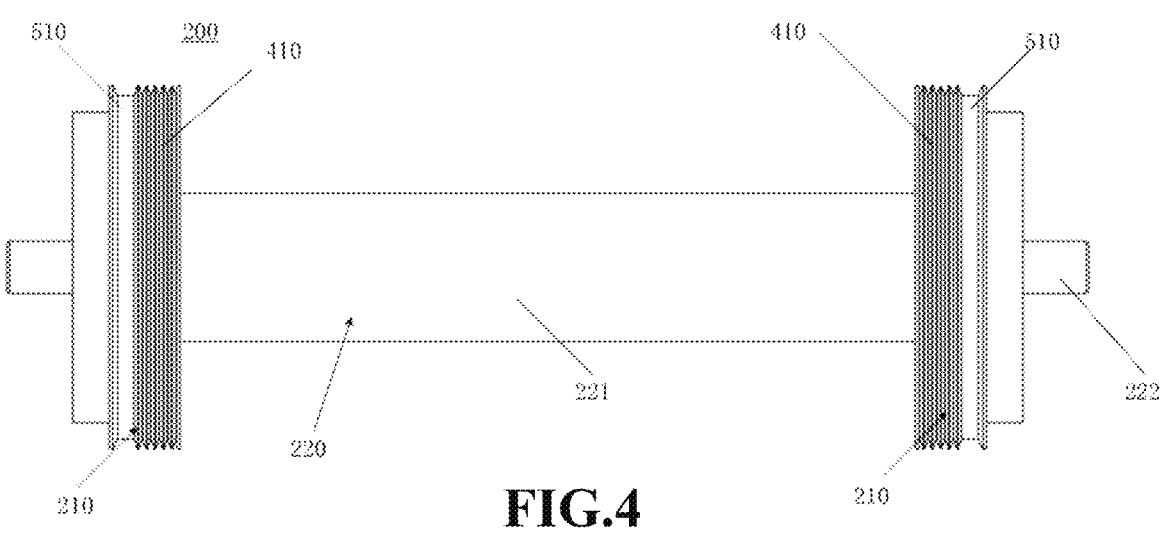
FIG. 4 is a schematic structural diagram of a driven roller of an transmission system in an embodiment of the present disclosure.

FIG. 1 is a schematic diagram of an overall structure of a transmission system in an embodiment of the present disclosure, FIG. 2 is a schematic plan view of a structure of a transmission system in an embodiment of the present disclosure, FIG. 3 is a schematic structural diagram of a driving roller of a transmission system of an embodiment of the present disclosure, and FIG. 4 is a schematic structural diagram of a driven roller of a transmission system in an embodiment of the present disclosure. Referring to FIG. 1 to FIG. 4, the embodiments of the present disclosure provide a transmission system for a treadmill, and the transmission system may include a driving roller 100, a driven roller 200 and first conveyor belts 300.

Specifically, the driving roller 100 includes driving wheels 110 and a first synchronization rod 120, the driving wheels 110 are arranged at both ends of the first synchronization rod 120, and the first synchronization rod 120 may be used for keeping the driving wheels 110 located at both ends rotating synchronously. The driven roller 200 includes driven wheels 210 and a second synchronization rod 220, the driven wheels 210 are arranged at both ends of the second synchronization rod 220, and the second synchronization rod 220 may be used for keeping the two driven wheels 210 located at both ends rotating synchronously.

Figure 5:
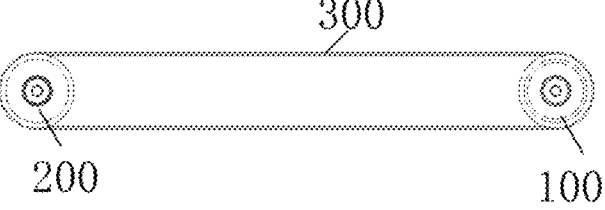
FIG. 5 is a schematic plan view of transmission of a transmission system in an embodiment of the present disclosure.
Figures 6, 7:
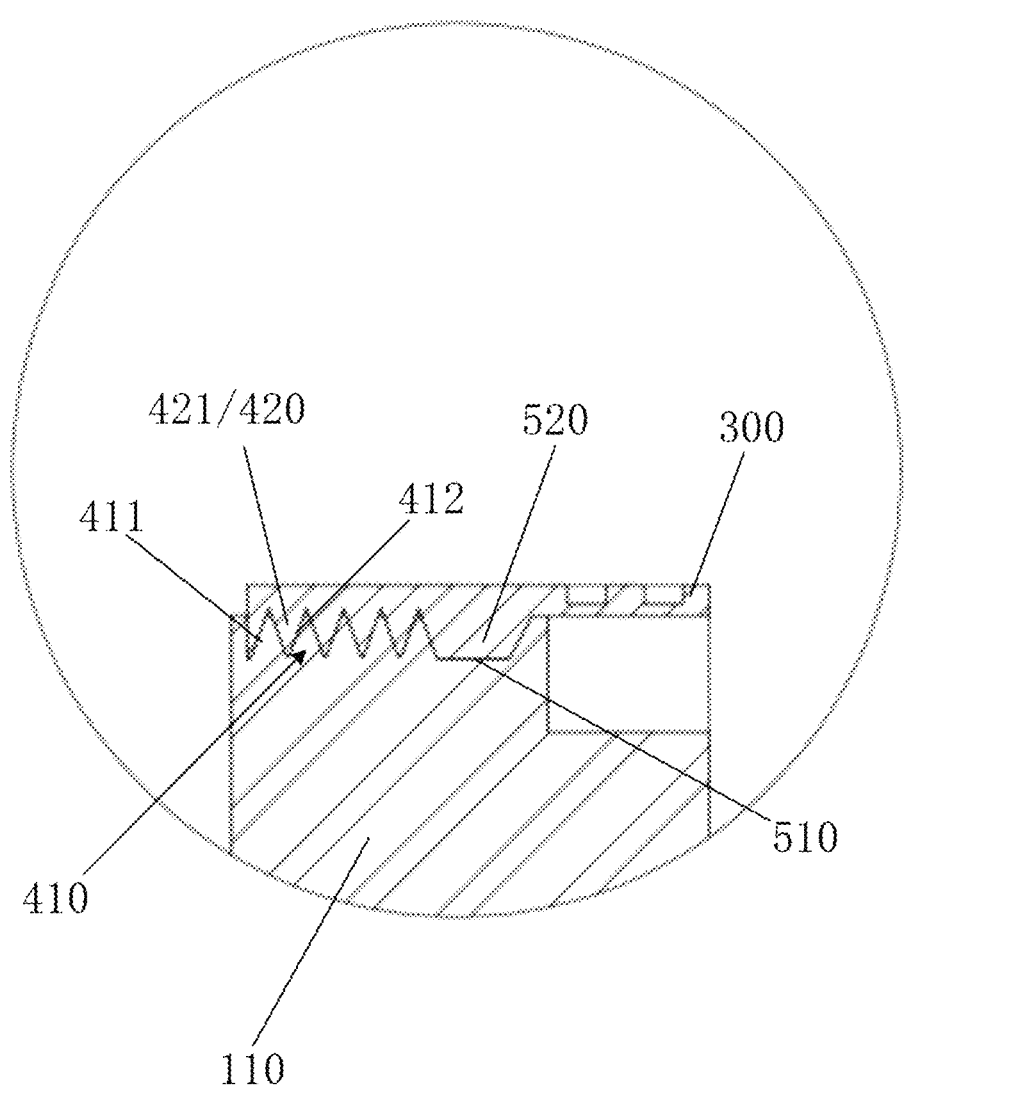
FIG. 6 is a schematic cross-sectional view of a transmission system in an embodiment of the present disclosure.
FIG. 7 is a schematic enlarged view of a portion in an embodiment of the present disclosure.

FIG. 5 is a schematic plan view of transmission of a transmission system in an embodiment of the present disclosure, FIG. 6 is a schematic cross-sectional view of a transmission system in an embodiment of the present disclosure, and FIG. 7 is a schematic enlarged view of a portion in an embodiment of the present disclosure. Referring to FIG. 5 to FIG. 7, exemplarily, first conveyor belts 300 are arranged on a driving wheel 110 and a driven wheel 210 on the same side, and the first conveyor belts 300 form transmission connection with the driving wheel 110 and the driven wheel 210. First edged portions 410 are arranged on working faces of the driving wheel 110 and the driven wheel 210, second edged portions 420 adapted to the first edged portions 410 are arranged on a working face of the first conveyor belts 300, and the first edged portions 410 are meshed with the second edged portions 420.

In the transmission system of the embodiment of the present disclosure, the driving roller 100 includes the driving wheels 110 and the first synchronization rod 120, and the driving wheels 110 are arranged at both ends of the first synchronization rod 120; the driven roller 200 includes the driven wheels 210 and the second synchronization rod 220, and the driven wheels 210 are arranged at both ends of the second synchronization rod 220; the first conveyor belts 300 are arranged on a driving wheel 110 and a driven wheel 210 on the same side, and the first conveyor belts 300 form transmission connection with the driving wheel 110 and the driven wheel 210; the first edged portions 410 are arranged on the working faces of the driving wheel 110 and the driven wheel 210, the second edged portions 420 adapted to the first edged portions 410 are arranged on the working face of the first conveyor belts 300, and the first edged portions 410 are meshed with the second edged portions 420. Such an arrangement may increase an area of contact of the first conveyor belts 300 with the driving wheel 110 and the driven wheel 210, and ensure that the first conveyor belts 300 rotate synchronously with the driving wheel 110 and the driven wheel 210, thereby increasing a friction force when the first conveyor belts 300 operate with the driving wheel 110 and the driven wheel 210, improving the synchronization of operation of the first conveyor belts 300 with the driving wheel 110 and the driven wheel 210, improving the stability of a process where the first conveyor belts 300 operate with the driving wheel 110 and the driven wheel 210, and facilitating a reduction of noise in an operation process of the transmission system.

Exemplarily, first edged portions 410 are arranged on the working faces of the driving wheel 110 and the driven wheel 210, the working face of the first conveyor belts 300 is provided with the second edged portions 420 adapted to the first edged portions 410, and the first edged portions 410 are meshed with the second edged portions 420. As for the first edged portions 410 being adapted to the second edged portions 420, it may be understood that the first edged portions 410 and the second edged portions 420 may be tightly clamped in shape and size, and after the first edged portions 410 and the second edged portions 420 are clamped, the second edged portions 420 may also be meshed with each other for transmission. As such, through the structural arrangement of the driving wheel 110, the driven wheel 210 and the first conveyor belts 300, the embodiment of the present disclosure improves the stability and synchronization of the transmission system, reduces noise, and will not increase the space occupied by the transmission system.

In an embodiment, as shown in FIG. 1, FIG. 2 and FIG. 6, the driving roller 100 is arranged opposite the driven roller 200 in a front-rear direction. The two driving wheels 110 are connected and installed at left and right ends of the first synchronization rod 120, and the two driven wheels 210 are connected and installed at left and right ends of the second synchronization rod 220. A driving wheel 110 located on a left side is arranged opposite to a driven wheel 210 located on the left side, and a driving wheel 110 located on a right side is arranged opposite to a driven wheel 210 located on the right side. The number of the first conveyor belts 300 is two, with one of the first conveyor belts 300 sleeved on the driving wheel 110 and the driven wheel 210 located on the left side, and the other of the first conveyor belts 300 sleeved on the driving wheel 110 and the driven wheel 210 located on the right side. The first synchronization rod 120 rotates to drive the driving wheels 110 located at both ends of the first synchronization rod 120 to rotate, and the two driving wheels 110 drive the driven wheels 210 located on the second synchronization rod 220 to rotate synchronously through the first conveyor belts 300, thereby achieving the conveying movement of the first conveyor belts 300 located between the driving rollers 100 and the driven rollers 200.

Exemplarily, the first synchronization rod 120 may be connected to an output end of a driving mechanism, such that the first synchronization rod 120 rotates around its central axis and drives the two driving wheels 110 to rotate synchronously, and the two driven wheels 210 rotate synchronously with the driving wheels 110 through the two first conveyor belts 300.

Referring to FIG. 3 and FIG. 6, exemplarily, the first synchronization rod 120 may include a first body rod section 121 arranged hollow, and a first axis rod section 122 arranged coaxially with the first body rod section 121. A diameter of the first body rod section 121 is greater than that of the first axis rod section 122, and a length dimension of the first body rod section 121 is smaller than that of the first axis rod section 122. The first axial rod section 122 passes through an inner hole of the first body rod section 121, and the first axial rod section 122 and the first body rod section 121 are rotationally connected through a bearing. Both ends of the first axis rod section 122 protrude beyond both ends of the first body rod section 121. The driving wheels 110 are located at both ends of the first body rod section 121, and the first edged portions 410 of the two driving wheels 110 are located on inner sides close to each other. The first body rod section 121 may be connected to the output end of the driving mechanism through a transmission mechanism, thereby achieving rotation of the first body rod section 121 driven by the driving mechanism, so as to enable the driving wheels 110 to rotate.

Referring to FIG. 4, exemplarily, the second synchronization rod 220 may include a second body rod section 221 arranged hollow, and a second axis rod section 222 arranged coaxially with the second body rod section 222. A diameter of the second body rod section 221 is greater than that of the second axis rod section 222, and a length dimension of the second body rod section 221 is smaller than that of the second axis rod section 222. The second axial rod section 222 passes through an inner hole of the second body rod section 221, and the second axial rod section 222 and the second body rod section 221 are rotationally connected through a bearing. Both ends of the second axis rod section 222 protrude beyond both ends of the second body rod section 221. The driven wheels 210 are located at both ends of the second body rod section 221, and the first edged portions 410 of the two driven wheels 210 are located on inner sides close to each other.

It should be noted that the first conveyor belts 300 may be a belt or a synchronous belt, and the first conveyor belts 300 may be arranged according to actual usage requirements.

Figures 8, 9, 10:
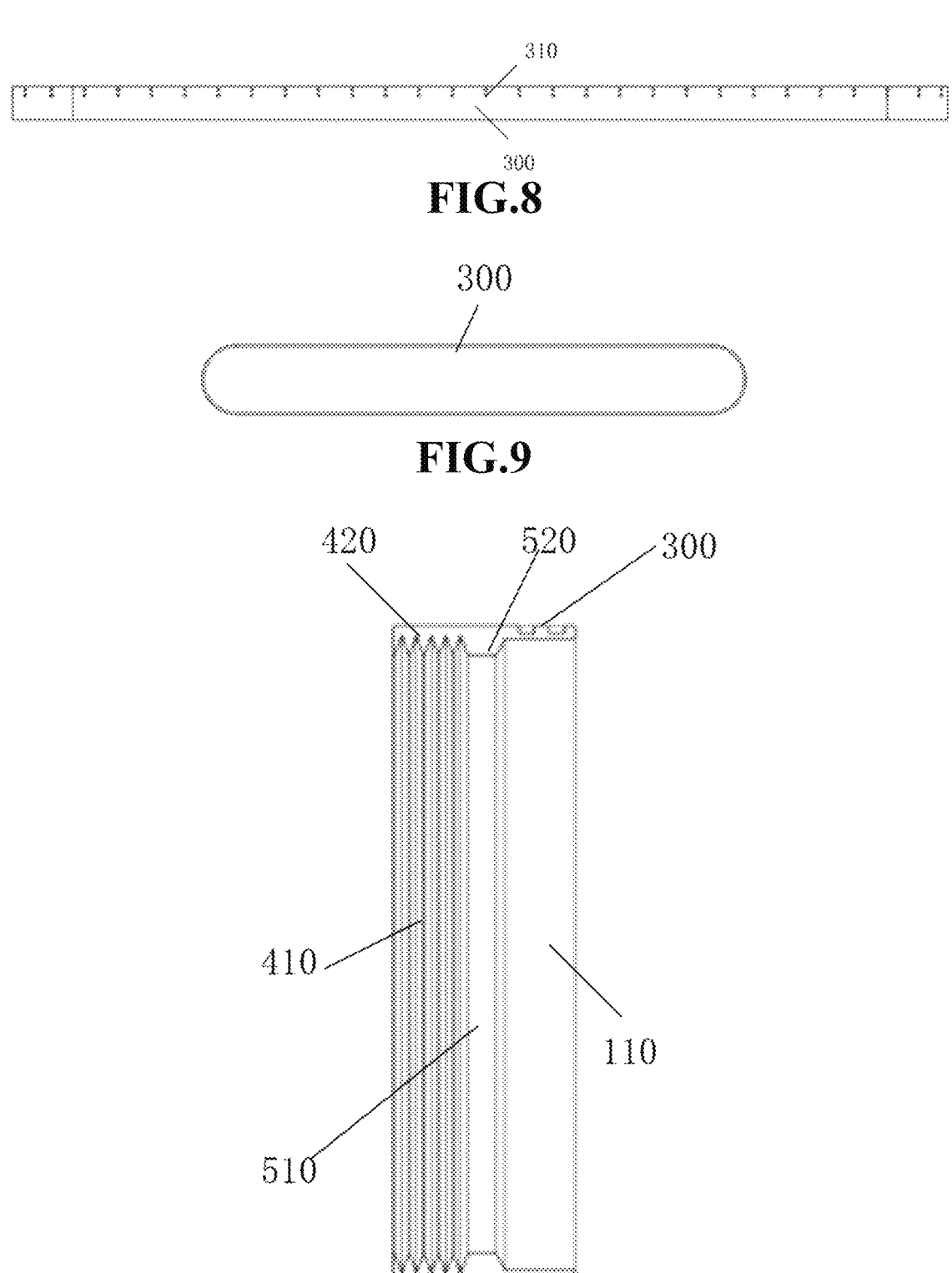
FIG. 8 is a schematic top plan view of first conveyor belts of a transmission system in an embodiment of the present disclosure.
FIG. 9 is a schematic front plan view of first conveyor belts of a transmission system in an embodiment of the present disclosure.
FIG. 10 is a schematic plan view of a driving wheel of a transmission system in an embodiment of the present disclosure.
Figure 11:
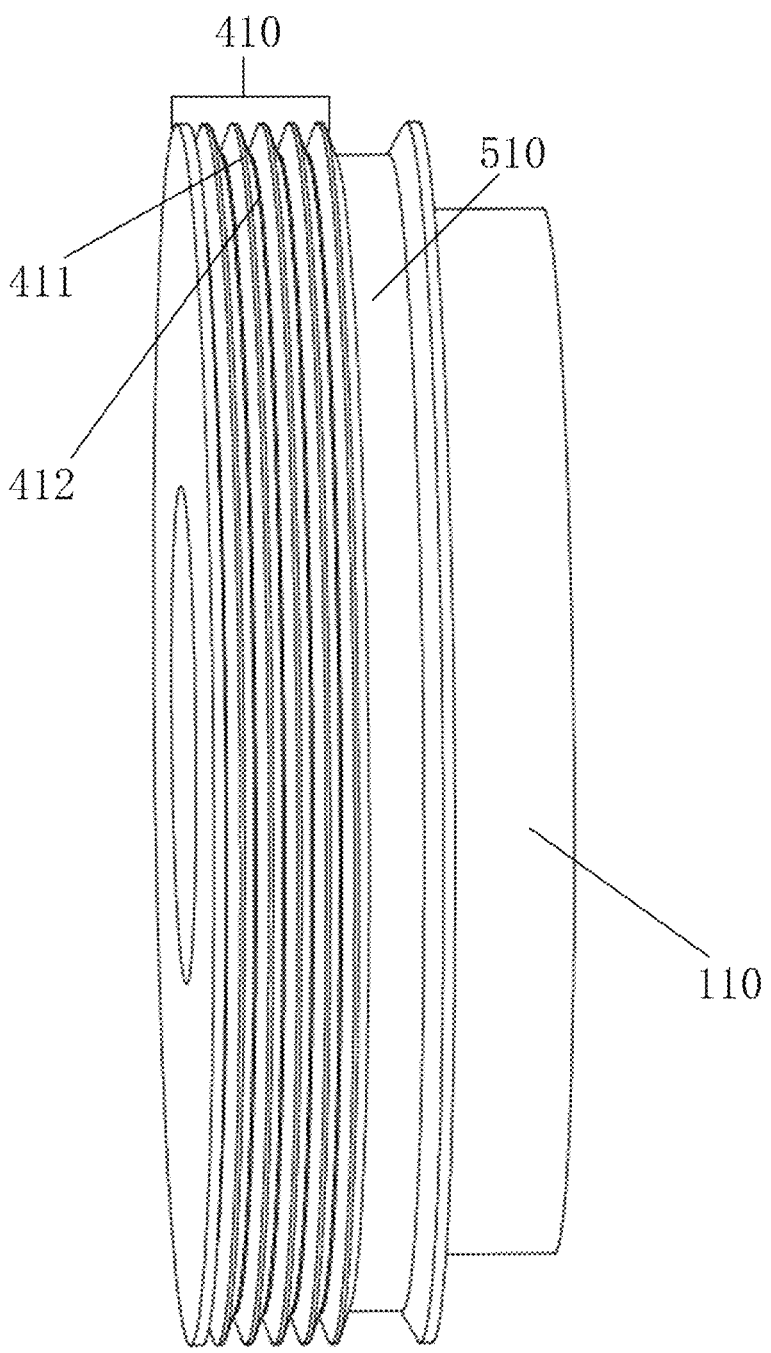
FIG. 11 is a schematic structural diagram of a driving wheel of a transmission system in an embodiment of the present disclosure.

FIG. 10 is a schematic plan view of a driving wheel of a transmission system in an embodiment of the present disclosure; and FIG. 11 is a schematic structural diagram of a driving wheel of a transmission system in an embodiment of the present disclosure. Referring to FIG. 7, FIG. 10 and FIG.

11, in an implementation, the first edged portions 410 include a plurality of first protrusions 411 in an edged shape arranged at intervals, the first protrusions 411 are arranged around outer circumferences of the driving wheels 110 and the driven wheels 110, first grooves 412 in an edged shape are formed between adjacent first protrusions 411, the second edged portions 420 include a plurality of second protrusions 421 in an edged shape arranged at intervals, and the second protrusions 421 are meshed with the first grooves 412.

Referring to FIG. 11, exemplarily, the driving wheel 110 includes a first wheel body having an axis provided with a through hole adapted to the first body rod section 121, and an outer circumferential face are provided with a first edged portion 410, the first edged portion 410 includes a plurality of first protrusions 411 in an edged shape arranged at intervals, the first protrusions 411 are arranged around the outer circumferential face of the first wheel body, and the number of the first protrusions 411 is at least two, and bottom ends of side walls of adjacent first protrusions 411 are connected to each other, thereby forming first grooves 412 in an edged shape on the first wheel body.

Exemplarily, the driven wheel 210 includes a second wheel body having an axis provided with a through hole adapted to the second body rod section 221, and an outer circumferential face provided with a first edged portion 410, the first edged portion 410 includes a plurality of first protrusions 411 in an edged shape arranged at intervals, the first protrusions 411 are arranged around the outer circumferential face of the second wheel body, and the number of the first protrusions 411 are at least two, and bottom ends of side walls of adjacent first protrusions 411 are connected to each other, thereby forming first grooves 412 in an edged shape on the second wheel body.

A working face of the first conveyor belts 300 is a side face in contact with the driving wheel 110 and the driven wheel 210, and the working face of the first conveyor belts 300 is provided with a second edged portion 420 including a plurality of second protrusions 421 arranged at intervals, the second protrusions 421 are arranged to extend along a length direction of the first conveyor belts 300. The number of the second protrusions 421 is also multiple. Second grooves are formed between adjacent second protrusions 421, and the second grooves may fit with the first protrusions 411. The second protrusions 421 are located in the first grooves 412, and opposite sidewall faces of the second protrusions 421 avoids contact with opposite sides of the first grooves 412, such that the second protrusions 421 may follow the rotation of the driving wheel to slide in the first grooves 412. The fitting between the second protrusions 421 and the first protrusions 411 increases a friction force when the first conveyor belts operate with the driving wheel and the driven wheel, improves the synchronization of operation of the first conveyor belts 300 with the driving wheel 110 and the driven wheel 210, and the stability in an operation process, and facilitates a reduction of noise in the operation process of the transmission system.

Referring to FIG. 7, FIG. 10 and FIG. 11, the number of the first protrusions 411 and the second protrusions 421 may be multiple, and the shape and number of the first protrusions 411 and the second protrusions 421 may be arranged according to actual usage requirements, to which no limitations are made in the embodiments of the present disclosure.

Referring to FIG. 7, in an implementation, a projection shape of the first protrusions 411 on an axial cross-section of the driving wheel 110 and the driven wheel 210 is a zigzag, and a projected shape of the second protrusions 421 on an axial cross-section of the driving wheel 110 and the driven wheel 210 is a zigzag.

Exemplarily, a sectional shape of the first protrusion 411 is a triangle, and a sectional shape of the second protrusion 421 is also a triangle. No limitation is made here to the specific shapes of the first protrusion 411 and the second protrusion 421, which may be arranged according to actual usage requirements.

In the embodiment of the present disclosure, the projection shapes of the first protrusions 411 and the second protrusions 421 on the axial cross-section of the driving wheel 110 and the driven wheel 210 are a zigzag, which can ensure that a friction force when the first conveyor belts operate with the driving wheel and the driven wheel, improve the synchronization of operation of the first conveyor belts with the driving wheel and the driven wheel, and the stability in an operation process, and facilitates a reduction of noise in the operation process of the transmission system.

Referring to FIG. 7, FIG. 10 and FIG. 11, in an implementation, the working faces of the driving wheel 110 and the driven wheel 210 are also provided with slots 510 arranged around circumferences of the driving wheel 110 and the driven wheel 210. The working face of the first conveyor belts 300 is provided with a bulge 520 adapted to the slots 510, the bulge 520 being arranged along the length direction of the first conveyor belts 300.

Exemplarily, the slots 510 are located on the working faces of the driving wheel 110 and the driven wheel 210. The depth of the slots 510 may be approximately equal to that of the first edged portion 410. The slots 510 are spaced apart from the first edged portion 410 respectively on the working faces of the driving wheel 110 and the driven wheel 210, and the slots 510 are arranged around outer rings of the driving wheel 110 and the driven wheel 210. The working face of the first conveyor belts 300 is provided with the bulge 520 arranged along the length direction of the first conveyor belts 300. The bulge 520 has a size and sectional shape adapted to those of the slot 510, and the bulge 520 may be clamped in the slot 510, which can further improve the synchronization of the meshing operation of the first conveyor belts with the driving wheel and the driven wheel and the stability in an operation process.

Referring to FIG. 7, in an implementation, a size of the slot 510 in an axial direction of the driving wheel 110 and the driven wheel 210 is smaller than that of the first edged portion 410 in the axial direction of the driving wheel 110 and the driven wheel 210.

Exemplarily, a slot 510 is arranged around the first wheel body of the driving wheel 110, and the slot 510 is spaced in parallel to the first edged portion 410 on the first wheel body. A slot 510 is arranged around the second wheel body of the driven wheel 210, and the slot 510 is spaced in parallel to the first edged portion 410 on the second wheel body. The slot 510 on the driving wheel 110 is the same in size and shape as the slot on the driven wheel 210. A size of the slot 510 in a width direction of the driving wheel 110 and the driven wheel 210 is smaller than that of the first edged portion 410 in the width direction of the driving wheel 110 and the driven wheel 210.

Referring to FIG. 7, in an implementation, a cross section of the slots 510 in the axial direction of the driving wheel and the driven wheel is a trapezoid, and a cross section of the bulges in the width direction of the first conveyor belts is a trapezoid.

Referring to FIG. 7, the cross section of the slot 510 in the axial direction of the driving wheel 110 and the driven wheel 210 is a trapezoid. For example, the slot 510 includes side walls arranged in a relatively inclined manner and a bottom wall, angles between the bottom wall and the side walls are an obtuse angle, and the bottom wall is a plane parallel to the working faces of the driving wheel 110 and the driven wheel 210, which can improve the synchronization of the meshing operation of the first conveyor belts with the driving wheel and the driven wheel and the stability of an operation process.

Referring to FIG. 1 and FIG. 2, in an implementation, the transmission system further includes rolling members 700 located below the first conveyor belts 300, and rolling faces of the rolling members 700 are in contact with bottom faces of the bulges 520. The bulges 520 have a bottom arranged to be planar, and the rolling faces of the rolling members 700 are in contact with the bottom faces of the bulges 520. That is to say, the rolling faces of the rolling members 700 are in contact fit with the bottom faces of the bulges 520, and the bulges 520 may slide along the rolling faces in a recipro-cating manner, which can enhance a friction force when the first conveyor belts 300 is in operation, improve the stability in a process where the first conveyor belts 300 operate with the driving wheel 110 and the driven wheel 210, and facilitate a reduction of noise in an operation process of the transmission system. Exemplarily, the rolling members 700 may be a rolling bearing. It should be noted that the rolling members 700 may also be other structures that can imple-ment rolling, and no limitation is made here to the specific structure of the rolling members 700, which may be arranged according to actual usage requirements.

Referring to FIG. 1 and FIG. 2, in an implementation, the transmission system further includes guide members 800 arranged on a side of the first conveyor belts 300, and arrayed at intervals along a conveying direction of the first conveyor belts 300.

Exemplarily, the guide members 800 may be a guide wheel or a guide post. The guide members 800 are arranged on an outer peripheral side of the first conveyor belts 300. The guide members 800 are arranged on a peripheral side of an edge in the conveying direction of the first conveyor belts 300. The number of the guide members 800 may be mul-tiple, and a plurality of guide members 800 may be evenly arrayed at intervals along the conveying direction of the first conveyor belts 300. Alternatively, the guide members 800 may also be arranged at a bottom of the first conveyor belts 300 (on a working surface side of the first conveyor belts 300) and evenly arrayed at intervals along a direction of the bottom. The guide members 800 may also be arranged on both side edges and the bottom of the first conveyor belts 300. The guide members 800 can play a role in supporting and guiding the lower part and sides of the first conveyor belts 300, which can improve the stability of the transmis-sion system and reduce the noise of the transmission system. It should be noted that no limitation is made here to the specific structure and number of the guide members 800, as long as they can play a supporting and guiding role.

In the transmission system of an embodiment of the present disclosure, the stability and reliability of the trans-mission system can be improved by arraying the guide members 800 at intervals along the conveying direction of the first conveyor belts 300.

Referring to FIG. 1 and FIG. 2, in an implementation, the first conveyor belts 300 are two first conveyor belts, and the two first conveyor belts 300 are respectively sleeved on the driving wheels 110 and the driven wheels 210 on both sides.

A caterpillar track 600 is connected between the two first conveyor belts 300, and includes a plurality of track strips 610 that are respectively fixed between the two first con-veyor belts 300.

Exemplarily, the caterpillar track 600 is in a structure of a closed ring. The caterpillar track 600 includes an inner surface and an outer surface that are oppositely arranged, and the inner surface of the caterpillar track 600 is connected to the outer surfaces of the two first conveyor belts 300, such that the two first conveyor belts 300 drive the caterpillar track 600 to move.

In an embodiment, the caterpillar track 600 may be a running belt for a treadmill, such that the caterpillar track 600 can be driven to rotate cyclically by the first conveyor belts 300 to implement the running function of the treadmill.

Exemplarily, the number of the first conveyor belts 300 is two, and the first conveyor belts 300 are respectively sleeved on the driving wheels 110 and the driven wheels 210 located on both sides. The caterpillar track 600 is connected between the two first conveyor belts 300, and is formed by splicing and combining a plurality of track strips 610, with each track strip 610 connected between the two first conveyor belts 300. The plurality of track strips 610 are arrayed in sequence along a circumference of the conveying direction of the first conveyor belts 300. Adjacent track strips 610 may be connected through a connecting structure to form a closed ring-shaped caterpillar track 600, and the track strips 610 may be fixed on two oppositely arranged first conveyor belts 300 through a fixing structure.

In one embodiment, the two first conveyor belts 300 are respectively provided with installation fixing holes for fixing the track strips 610, and the installation fixing holes of the two first conveyor belts 300 are evenly spaced along the length direction of the first conveyor belts 300, the instal-lation fixing holes of the two first conveyor belts 300 located on opposite close sides of the first conveyor belts 300. Fastening posts are arranged protruding from both sides of each track strip 610 in a length direction, and two fastening posts may be respectively inserted into position-correspond-ing installation fixing holes on the two first conveyor belts 300. Such an arrangement can ensure the parallelism of the plurality of track strips 610 between the two first conveyor belts 300, and can further ensure the stability of the overall operation of the caterpillar track 600.

FIG. 8 is a schematic top plan view of first conveyor belts of a transmission system in an embodiment of the present disclosure; and FIG. 9 is a schematic front plan view of first conveyor belts of a transmission system in an embodiment of the present disclosure. Referring to FIG. 8 and FIG. 9, in an implementation, fixing holes 310 are arranged at intervals on the opposite close sides of the two first conveyor belts 300, and the plurality of tracks 610 are in fixed connection with the first conveyor belts 300 by fasteners passing through the fixing holes 310. For example, the fixing holes 310 are arrayed at intervals on the relatively close sides of the two first conveyor belts 300 according to a width dimension of the track strips 610, and the plurality of track strips 610 are in fixed connection with the first conveyor belts 300 by fasteners passing through the fixing holes 310.

In an embodiment, elastic members (not shown in the figure) may be further arranged between the first conveyor belts 300 and the track strips 610, and the fasteners on the track strips 610 may pass through the elastic members to be fitted and installed in the fixing holes 310. As such, direct contact between the track strips 610 and the first conveyor belts 300 can be avoided, which can further achieve vibra-tion absorption and buffering effects.

In an embodiment, the track strips of the caterpillar track 600 may be formed with a combination of metal and elastic materials. For example, the track strips 610 are made of a combination of aluminum alloy and elastic rubber. Each track strip 610 may employ a structure where synthetic rubber covers the outer surface of aluminum alloy. Such an arrangement can ensure the rigidity of the track strips 610 and make the outer surface of the track strips 610 have a certain elasticity, such that the caterpillar track 600 can provide certain vibration absorption and buffering effects for a user who is doing running exercise on the caterpillar track 600, thereby improving the user's experience. It should be noted that no limitation is made here to the material and structure of the track strips 610 in the embodiment of the present disclosure, which may be arranged according to actual usage requirements.

Referring to FIG. 1 and FIG. 2, an embodiment of the present disclosure further provides a treadmill that employs the transmission system of any embodiment of the present disclosure. The treadmill in the embodiment of the present disclosure, by employing the transmission system of an embodiment described above, can ensure synchronous rotation of the first conveyor belts with the driving wheels and the driven wheels, thereby increasing a friction force when the first conveyor belts operate with the driving wheels and the driven wheels, improving the synchronization of operation of the first conveyor belts with the driving wheels and the driven wheels, improving the stability of a process where the first conveyor belts operate with the driving wheels and the driven wheels, and facilitating a reduction of noise in an operation process of the transmission system. Moreover, the treadmill employs the above transmission system, which does not increase the overall space occupied by the treadmill and improves the practicality of the treadmill.

Referring to FIG. 1 and FIG. 2, in an implementation, the treadmill further includes a driving mechanism 910 in transmission connection with the first synchronization rod 120 through a pulley mechanism 920, the pulley mechanism 920 including a first pulley 921 connected to an output shaft of the driving mechanism 910, a second pulley 922 connected to the first synchronization rod 120, and a second conveyor belt 923 arranged on the first pulley 921 and the second pulley 922. For example, the second conveyor belt 923 may be a poly V-belt, a synchronous belt, or a belt.

Exemplarily, the first conveyor belts 300 reciprocate in an annular manner around the driving roller 100 and the driven roller 200. An accommodation region is formed between upper and lower end faces of the first conveyor belts 300, and the driving mechanism 910 may be installed in the accommodation region, which can further reduce the space occupied by the treadmill and improve the practicality of the treadmill.

Exemplarily, the driving mechanism may be a driving motor. The treadmill may further include a control module that may be electrically connected to the driving motor. For example, the control module may be a control chip or a control circuit board. The control module may be used for controlling the driving motor, and driving the pulley mechanism to rotate through the driving motor, thereby driving the first synchronization rod to drive the driving wheels, the first conveyor belts and the driven wheels to rotate.

The treadmill in the embodiments of the present disclosure rotates clockwise through the driving mechanism, the driving mechanism rotates to drive the first synchronization rod to rotate synchronously through the second conveyor belt, the first synchronization rod drives the driving wheels to rotate synchronously, the driving wheels rotate synchronously to drive the driven wheels through the first conveyor belts, the caterpillar track fixed on the first conveyor belts rotates together therewith, and the caterpillar track forms a moving platform.

The transmission system of embodiments described above and other components of the treadmill may be implemented by employing various technical solutions known to those of ordinary skill in the art now or in the future, which will not be described in detail here.

In the description of the specification, it is understood that the orientation or positional relation denoted by terms such as "center", "longitudinal", "transverse", "length", "width", "thick", "upper", "lower", "front", "rear", "left", "right", "vertical", "horizontal", "top", "bottom", "in", "out", "clockwise", "counterclockwise", "axial", "radial", and "circumferential" is an orientation or positional relation based on the drawings, which is only for the description of the present disclosure and for simplification, instead of indicating or implying that the denoted device or element must adopt a particular orientation, or be constructed or operated in a particular orientation, and thus cannot be understood as limitations to the present disclosure.

In addition, terms such as "first" and "second" are only for the purpose of description and cannot be understood to indicate or imply the relative importance or to indicate implicitly the number of the technical features as designated. Accordingly, a feature limited by "first" or "second" may include, explicitly or implicitly, one or more of such features. In the description of the present disclosure, "a plurality of" means two or more, unless specifically limited otherwise.

In the present disclosure, unless specifically specified and limited otherwise, terms such as "mount", "connect to", "connect", and "fix" should be understood as generic terms. For example, it may be a fixed connection, and may also be a removable connection, or an integration; it may be a mechanical connection, may also be an electrical connection, and may further be a communication; it may be a direct connection, may also be an indirect connection with each other by an intermediate medium, and may be an internal connectivity or interaction relationship between two elements. For those of ordinary skill in the art, the specific meanings of the above terms in the present disclosure may be understood in the light of specific circumstances.

In the present disclosure, unless specifically specified or limited otherwise, a first feature being "above" or "below" a second feature may include the case that the first feature contact the second feature directly, and may also include the case that the first feature contact the second feature not directly, but by an additional feature therebetween. Moreover, a first feature being "above", "over" and "on" a second feature includes the case that the first feature is right above and obliquely above the second feature, or only represents that the horizontal height of the first feature is greater than that of the second feature. A first feature being "below", "beneath", and "under" a second feature includes the case that the first feature is right below and obliquely below the second feature, or only represents that the horizontal height of the first feature is smaller than that of the second feature.

The above disclosure provides many different implementations or examples to achieve different structures of the present disclosure. In order to make the present disclosure brief, particular examples of components and arrangements are described above. Obviously, they are only examples and are not intended to make any limitations to the present disclosure. In addition, repetition may be made for reference numerals and/or reference letters in different examples of the present disclosure, and this repetition is for the purposes of briefness and clarity, which does not indicate any relationship between the various implementations and/or arrangements as discussed.

The above are only specific implementations of the present disclosure, but the protection scope of the present disclosure is not limited thereto. Within the technical scope disclosed in the present disclosure, any person familiar with the technical field may readily envisage various variations or alternatives thereof, which should all be covered by the protection scope of the present disclosure. The protection scope of the present disclosure should therefore be subject to that of the claims.

What is claimed is:

1. A transmission system for a treadmill, comprising:
a driving roller, comprising a first synchronization rod and driving wheels arranged at both ends of the first synchronization rod;
a driven roller, comprising a second synchronization rod and driven wheels arranged at both ends of the second synchronization rod; and
first conveyor belts, arranged on driving wheels and driven wheels located on the same side, and forming transmission connection with the driving wheels and the driven wheels on the same side;
wherein working faces of each of the driving wheels and of each of the driven wheels are provided with first edged portions arranged around outer circumferences of the driving wheels and the driven wheels, working faces of the first conveyor belts are provided with second edged portions adapted to the first edged portions, and the first edged portions are meshed with the second edged portions;
wherein slots different from the first edged portions are arranged on the working faces of each of the driving wheels and of each of the driven wheels, the slots are arranged around circumferences of the driving wheels and the driven wheels, the working faces of the first conveyor belts are provided with bulges adapted to the slots which are different from the second edged portions, and the bulges are arranged to extend along a length direction of the first conveyor belts.

2. The transmission system according to claim 1, wherein the first edged portions comprise a plurality of first protrusions in an edged shape arranged at intervals, the first protrusions are arranged around the outer circumferences of the driving wheels and the driven wheels, first grooves in an edged shape are formed between adjacent first protrusions, the second edged portions comprise a plurality of second protrusions in an edged shape arranged at intervals, and the second protrusions are meshed with the first grooves.

3. The transmission system according to claim 2, wherein a projection shape of the first protrusions on an axial cross-section of the driving wheels and the driven wheels is a zigzag, and a projection shape of the second protrusions on the axial cross-section of the driving wheels and the driven wheels is a zigzag.

4. The transmission system according to claim 1, wherein a size of the slots in an axial direction of the driving wheels and the driven wheels is smaller than a size of the first edged portions in the axial direction of the driving wheels and the driven wheels.

5. The transmission system according to claim 1, wherein a cross-section of the slots in the axial direction of the driving wheels and the driven wheels is a trapezoid, and a cross-section of the bulges in a width direction of the first conveyor belts is a trapezoid.

6. The transmission system according to claim 1, further comprising rolling members located below the first conveyor belts, and rolling faces of the rolling members are in contact with bottom faces of the bulges.

7. The transmission system according to claim 1, further comprising guide members arranged on a side of the first conveyor belts, and arrayed at intervals along a conveying direction of the first conveyor belts.

8. The transmission system according to claim 1, wherein the first conveyor belts are two first conveyor belts, the first conveyor belts are respectively sleeved on the driving wheels and the driven wheels on both sides, a caterpillar track is connected between the two first conveyor belts, and the caterpillar track comprises a plurality of track strips respectively fixed between the two first conveyor belts.

9. The transmission system according to claim 8, wherein fixing holes are arranged at intervals on opposite close sides of the two first conveyor belts, and the plurality of track strips are in fixed connection with the first conveyor belts by fasteners passing through the fixing holes.

10. A treadmill, comprising the transmission system according to claim 1.

11. The treadmill according to claim 10, wherein the treadmill further comprises a driving mechanism in transmission connection with the first synchronization rod through a pulley mechanism, the pulley mechanism comprising a first pulley connected to an output shaft of the driving mechanism, a second pulley connected to the first synchronization rod, and a second conveyor belt arranged on the first pulley and the second pulley.

* * * * *